United States Patent [19]

Kretschmer, Jr. et al.

[11] Patent Number: 4,914,442
[45] Date of Patent: Apr. 3, 1990

[54] ADAPTIVE MTI TARGET PRESERVATION

[75] Inventors: Frank F. Kretschmer, Jr., Laurel, Md.; Bernard L. Lewis, Satellite Beach, Fla.

[73] Assignee: The United States of America as represented by the Secretary of the Navy, Washington, D.C.

[21] Appl. No.: 304,041

[22] Filed: Jan. 30, 1989

[51] Int. Cl.$^4$ .............................................. G01S 13/52
[52] U.S. Cl. .................................... 342/162; 342/381
[58] Field of Search ................................ 342/160–162, 342/381

[56] References Cited

U.S. PATENT DOCUMENTS

| | | |
|---|---|---|
| 3,995,271 | 11/1976 | Goggins, Jr. |
| 4,086,592 | 4/1978 | Lewis et al. |
| 4,117,538 | 9/1978 | Shrader et al. |
| 4,398,197 | 8/1983 | Dillard .................. 342/162 |
| 4,742,353 | 5/1988 | D'Addio et al. .................. 342/162 |

OTHER PUBLICATIONS

"A Digital Open-Loop Adaptive Processor", by F. Kretschmer, Jr., et al., in Aspects of Radar Signal Processing, Artech House, Norwood, Mass. 1986, pp. 130–136.

Primary Examiner—Thomas H. Tarcza
Assistant Examiner—Mark Hellner
Attorney, Agent, or Firm—Thomas E. McDonnell; Peter T. Rutkowski

[57] ABSTRACT

A method of preserving targets in the clear in an adaptive baseband MTI radar system with pulse compression is disclosed. The angle of the weighting signal is determined from the inverse tangent of the inphase and quadrature components of the weighting signal. This angle is then compared to a threshold angle in order to generate a modified weighting signal.

6 Claims, 6 Drawing Sheets

ADAPTIVE MTI TARGET PRESERVATION

BACKGROUND OF THE INVENTION

1. Field Of The Invention

This invention is directed to moving target indicator (MTI) radar systems, and more particularly to improved methods for adaptive target detection in MTI radar systems.

2. Background Description

A problem with adaptive MTI used in conjunction with a pulse compression system is that the adaptive MTI may cancel targets in the clear. This is due to the fact that the weights in the adaptive MTI can set up on the relatively long uncompressed target appearing on successive returns and result in target cancellation. Target cancellation can be prevented by offsetting the weights so they are not applied to the range cells which are used to derive the weights. For long pulse compression waveforms, however, it is necessary to offset the weights by a number of range cells equal to the pulse compression ratio $\rho$, which might typically be hundreds of range cells. This then precludes proper operation of an MTI in a range-dependent clutter environment.

SUMMARY OF THE INVENTION

Accordingly, it is an object of the invention to detect targets in a clear or clutter background with an adaptive MTI radar system.

Another object of the invention is to prevent cancellation of signals from targets in the clear which are processed by an adaptive MTI radar system.

Another object is to cancel clutter without cancelling the target signal.

Yet another object of the invention is to enhance signals from moving targets in the clear in an adaptive MTI radar system.

These and other objects of the invention are achieved by a method of automatically shifting the phase of a weighting signal generated by a digital open-loop canceller in an adaptive MTI system. For weighting signal phase angles less than or equal to a preselected threshold angle, the weighting signal phase is left unchanged, thereby permitting relatively weak moving target signals embedded in strong clutter to be detected. However, for weighting signal phase angles greater than the preselected threshold angle, the weighting signal phase is shifted by 180 degrees, thereby both preventing cancellation and providing enhancement for moving target signals in the clear.

Other objects, features and advantages of the invention will be apparent to those skilled in the art from the description of the preferred embodiment as described below and also recited in the appended claims.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DESCRIPTION OF THE PREFERRED EMBODIMENT

Figure 1:
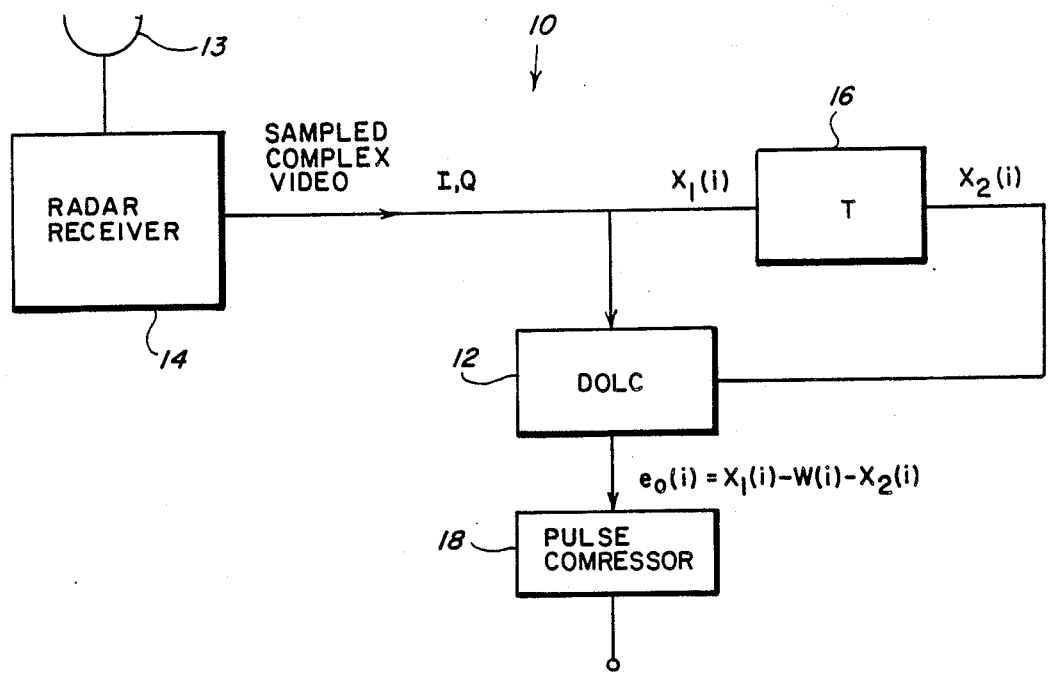
FIG. 1 is a block diagram of an adaptive MTI system with a pulse compressor.

Referring now to the drawings and more particularly to FIG. 1, a two pulse adaptive MTI system 10 making use of a digital open loop canceller (DOLC) 12 is shown. An antenna 13 receives target return pulses that are fed to receiver 14 which processes the pulses to provide digitized and time sampled video signals $x_1(i)$ having digital in-phase, I, and quadrature, Q, components. The signal $x_1(i)$ is ed to a one-prf delay means 16 in the customary manner for an MTI. The output of the one-prf delay means 16 is the signal $x_2(i)$. If the target is moving, successive pulses will have a phase change between them. The signals $x_1(i)$ and $x_2(i)$ are fed respectively to the $x_1(i)$ and $x_2(i)$ inputs for the digital open-loop canceller 12 described in FIG. 2 below. Thereafter the residue signal is compressed in the pulse compressor 18 to integrate signal energy to get a desired range resolution. By definition, an MTI system removes signals that are correlated on a pulse-to-pulse basis (i.e., from a stationary target) and only passes signals that are uncorrelated (i.e., vary in phase from pulse-to-pulse). The digital open-loop canceller 12 performs this function of passing only uncorrelated moving-target signals.

Figure 2:
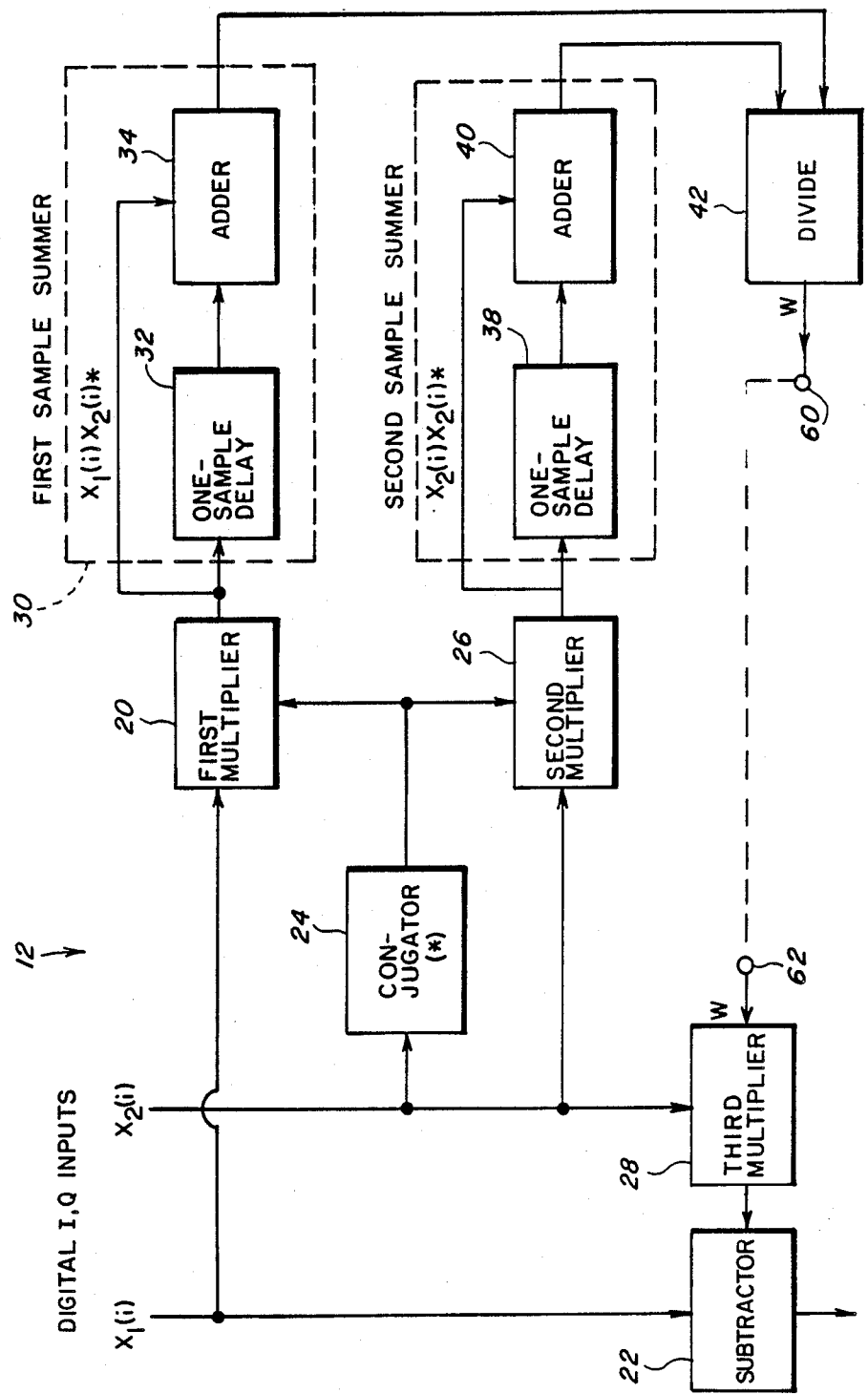
FIG. 2 is a block diagram of a prior art digital open-loop canceller.

FIG. 2 is a schematic diagram of a conventional DOLC 12, wherein the digital I and Q components of $x_1(i)$ are fed to a first multiplier 20 and to a subtractor 22. The digital I and Q components of $x_2(i)$ are fed to a conjugator (*) 24, a second multiplier 26 and to a third multiplier 28. The conjugator receives the I and Q components of $x_2(i)$ and multiplies the imaginary part Q by $-1$ to obtain $x_2(i)^*$. The output of conjugator 24 is fed to first multiplier 20 for multiplication with $X_1(i)$ to obtain the product $x_1(i) \cdot x_2(i)^*$. The product is applied to first sample summer 30 which will sum N samples from N range cells. An example of a two-sample summer is shown as comprising a one-sample delay 32 and adder 34. The first signal is delayed one sampling period in one sample delay means 32 and then added to a second sample in adder 34. The output of conjugator 24 is also fed to secod multiplier 26 for multiplication with $x_2(i)$ to obtain the product $x_2(i) \cdot x_2(i)^*$. The product is applied to second sample summer 36 which sums N samples from N range cells. Sample summer 36 is also shown for illustrative purposes to have one-sample delay 38 and adder 40 and is the same as sample summer 30.

Figure 3:
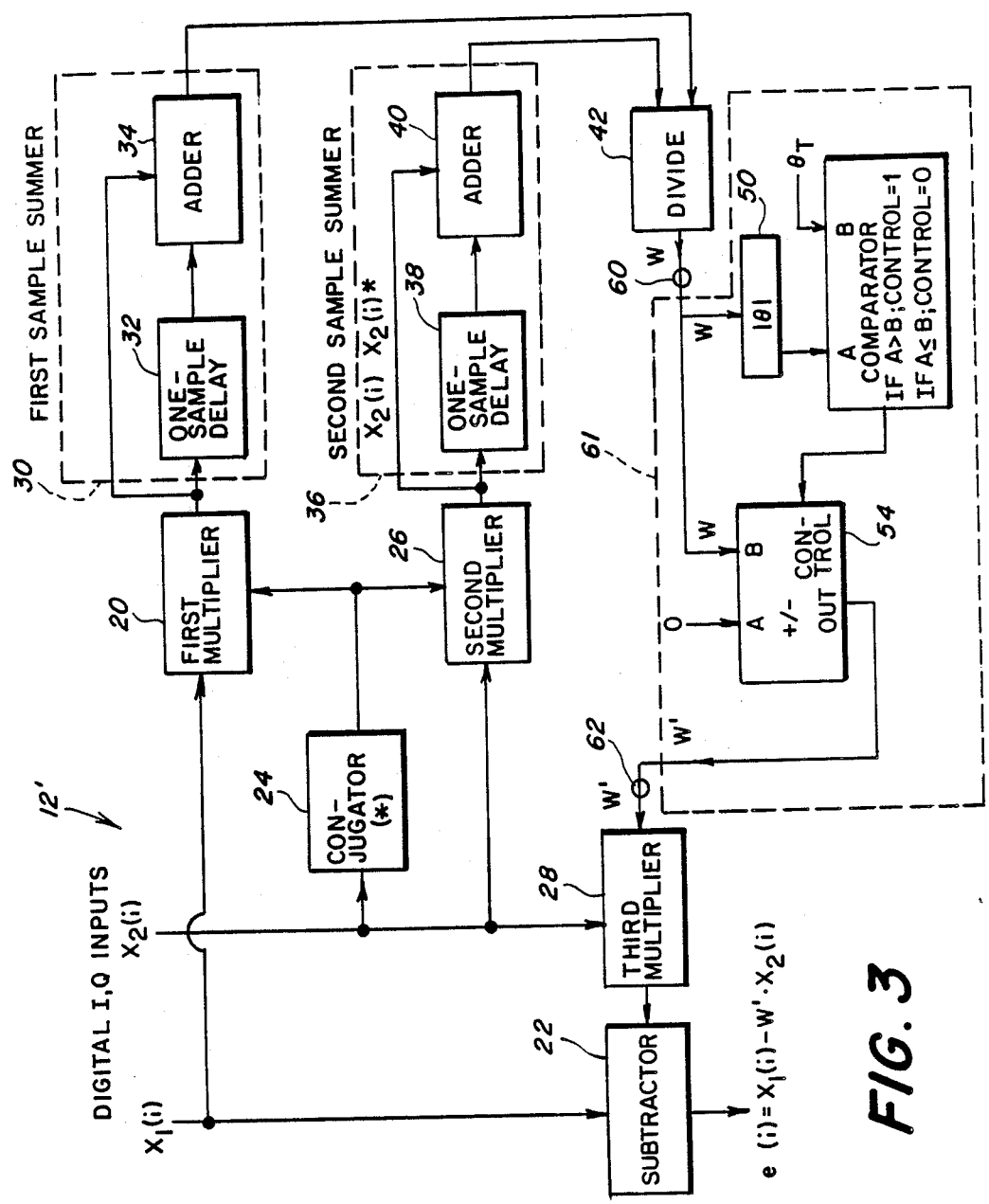
FIG. 3 is a block diagram of a digital open-loop canceller of the preferred embodiment with a modified weight.

The output sums from sample summers 30, 36 are used as part of an averaging process. Normally, to average, the output sums of sample summers 30 and 36 would be divided by the number of the samples summed. However, since the outputs are fed to a divider 42 the sample number which is the same for each sample summer cancels itself out in the division. The output of divider 42, weight W, is fed to third multiplier 28, which also receives $x_2(i)$. The output of multiplier 28 is fed to subtracter 22, which also receives $x_1(i)$. The line between terminals 60 and 62 in FIG. 2 is drawn in phantom, to indicate where circuitry is inserted to modify the weight as described below in conjunction with the DOLC 12' of preferred embodiment as illustrated in FIG. 3. However, in FIG. 2, terminals 60 and 62 are directly connected. For more details on the operation of the circuit of FIG. 2, refer to U. S. Pat. No. 4,086,592 issued to Lewis et al. on Apr. 25, 1978, which patent is herein incorporated by reference.

In operation, the digital open-loop canceller 12 described in FIG. 2 above may be substituted for a closed-loop adaptive canceller in most applications. Such a digital open loop canceller has been described in "Aspects of Radar Signal Processing" by Bernard Lewis, Frank Kretschmer and Wesley Shelton; Artech House, Norwood, Ma. 1986, pp. 130-137.

The clutter cancellation notch width of the baseband MTI in terms of a moving target signal can be controlled by modifying the weight computed in the DOLC 12. This complex weight, W, normally developed in the DOLC 12 is given by the relationship:

$$W(i) = \frac{\sum_{k=i-N+1}^{i} x_1(k) \cdot x_2^*(k)}{\sum_{k=i-N+1}^{i} |x_2(k)|^2} \quad (1)$$

where N is the number of sampled range cells used in computing the weight, $x_1(i)$ is the ith sampled complex signal for a range cell, $x_2(i)$ is the ith sampled complex signal delayed by one pulse repetition interval T and $x_2^*(i)$ is the conjugate of $x_2(i)$. The residue signal at the output of the conventional DOLC in FIG. 2, $e_0(i)$, is given by $$e_0(i) = x_1(i) - W(i) \cdot x_2(i) \quad (2)$$

Thereafter the residue signal is compressed in the pulse compressor 18 to integrate signal energy to get a desired range resolution.

When a target is embedded in strong clutter, the DOLC weights will in effect be determined by the clutter and cancel the clutter. The target response is determined by the frequency separation of the target from the clutter cancellation notch. However, for targets appearing in the presence of noise alone, this weight can set up on the target and cause target cancellation. The amount of cancellation depends on the S/N ratio and the number of samples averaged in the canceller.

To prevent this cancellation, the invention modifies the weight W when the absolute value of its angle $\Theta$ exceeds a certain predetermined threshold angle $\Theta_T$. The weight W is allowed to be used in the normal manner when the absolute value of the angle of the weight W is less than the threshold angle $\Theta_T$. If the angle $|\Theta|$ is greater than the threshold angle $\Theta_T$, the polarity of the weight W is reversed. This has the affect of doubling the amplitude gain of the target signal for moving targets in a thermal noise background. In operation, the threshold angle $\Theta_T$ is selected by an operator, depending on the local clutter environment to provide optimum clutter cancellation.

These relations can be stated in terms of a new weight W' as follows:

If $|\Theta| \leq \Theta_T$, W' = W

If $|\Theta| > \Theta_T$, W' = −W  (3)

wherein $\Theta = \tan^{-1} Q/I$, and I and Q are the in phase and quadrature channels respectively of complex weight W.

FIG. 3 is a schematic diagram of the digital open-loop canceller 12' of the preferred embodiment, used to modify the weight, to prevent target cancellation for targets appearing in the presence of noise alone. FIG. 3 is identical to FIG. 2 with the exception of the circuitry in block 61 for modifying the weight signal W. Therefore, with regard to FIG. 3, only the circuitry 61 between terminals 60 and 62 will be described. A weight signal W is received by circuit 50, which determines the absolute value of the weight angle in a known manner. Circuit 50 is connected to comparator 52, such that the absolute value of the weight angle $|\Theta|$ is compared to a predetermined threshold angle $\Theta_T$. The threshold angle $\Theta_T$, for example, may be set by an operator from a look-up table, and sent to the comparator 52 at input B. Comparator 52 is connected to a +/− circuit 54. If the weight angle $|\Theta|$ is greater than the predetermined threshold angle $\Theta_T$, then the control in the +/− circuit 54 is set to 1. With the control set to 1, the +/− circuit 54 acts to subtract the weight W, which is the inputted at terminal B, from a digital 0 which is the input at terminal A. Thus the output, W' from the +/− circuit 54 is equal to −W. When the comparator 52 determines that the weight angle $|\Theta|$ is less than or equal to the preselected threshold angle $\Theta_T$, then a digital zero is the output to the control of the +/− circuit 54. The +/− circuit 54 then acts to add the weight W at input B to a digital zero input at terminal A, such that the output W' from the +/− circuit 54 is equal to W. The weight W' is sent to a third multiplier 28.

Figure 4A:
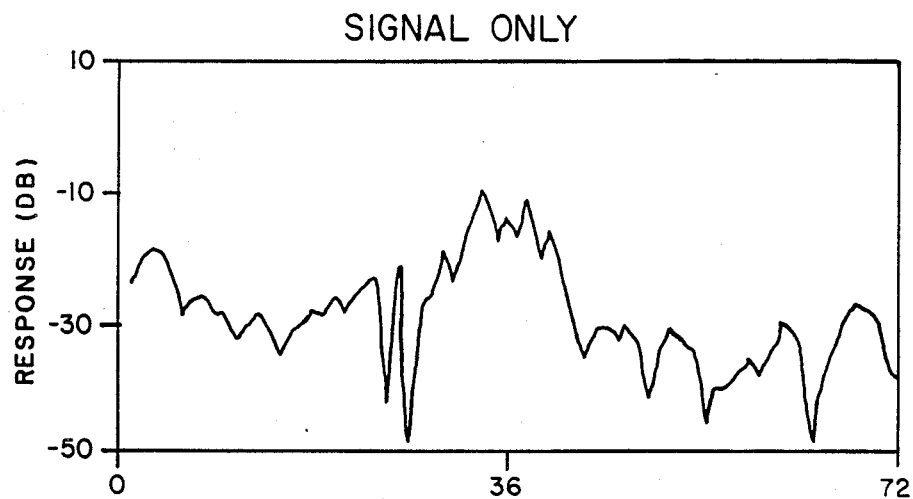
FIG. 4(a-c) is a graphic representation of the separate signal and noise components and the combination thereof when $|\Theta| \leq \Theta_T$.
Figure 4B:
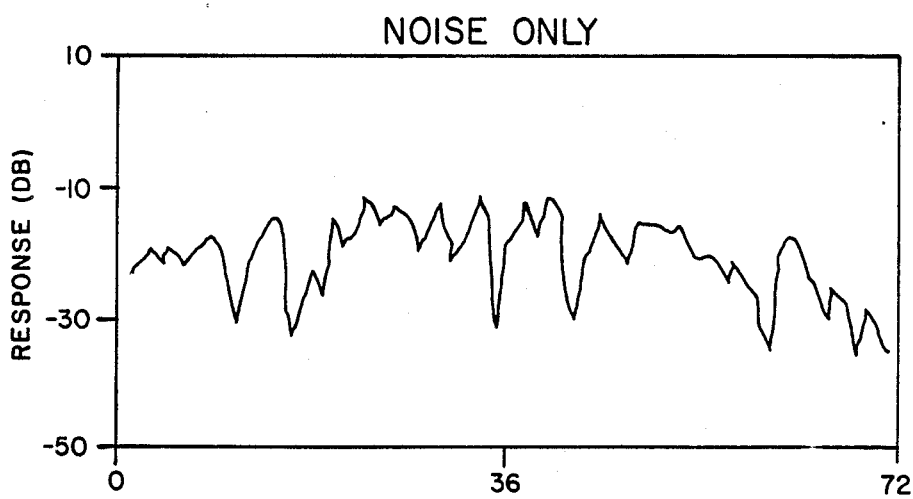
Figure 4C:
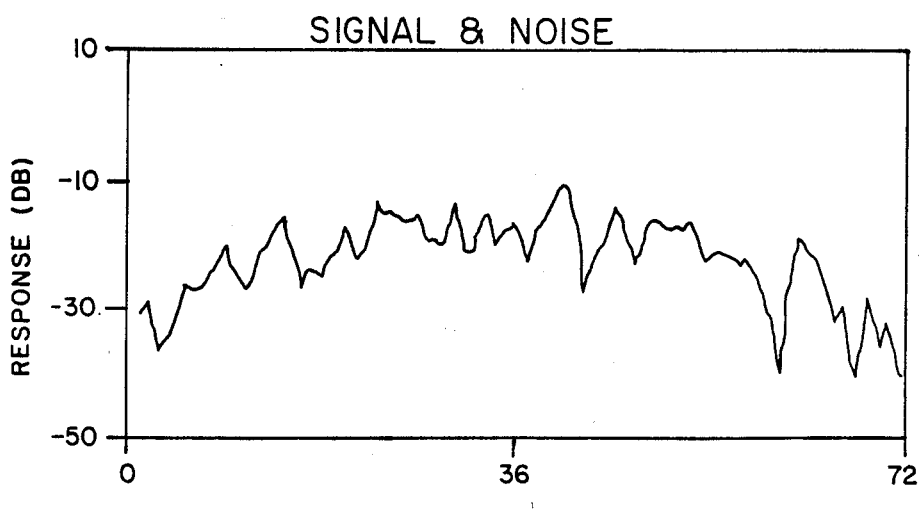
Figure 5A:
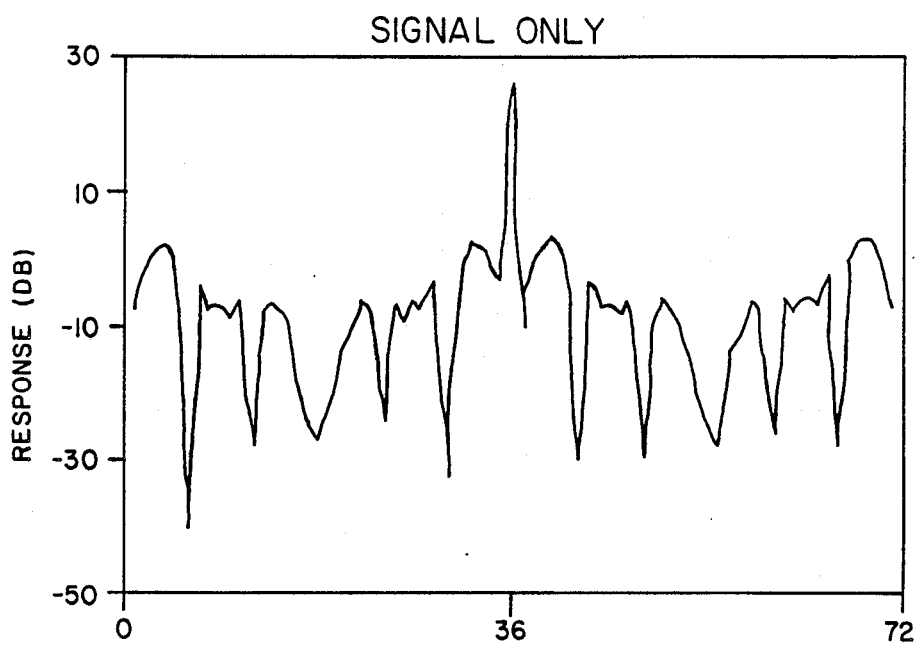
FIG. 5(a-c) is a graphic representation of the separate signal and noise components and the combination thereof when $|\Theta| > \Theta_T$.
Figure 5B:
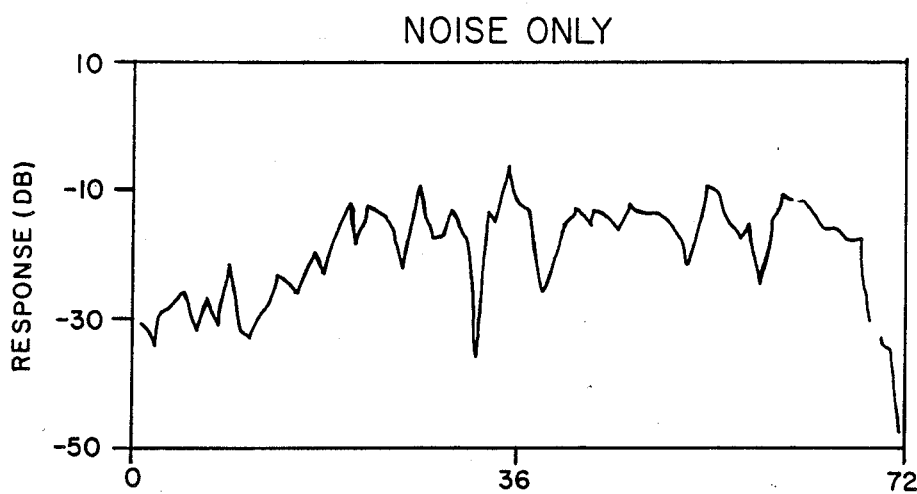
Figure 5C:
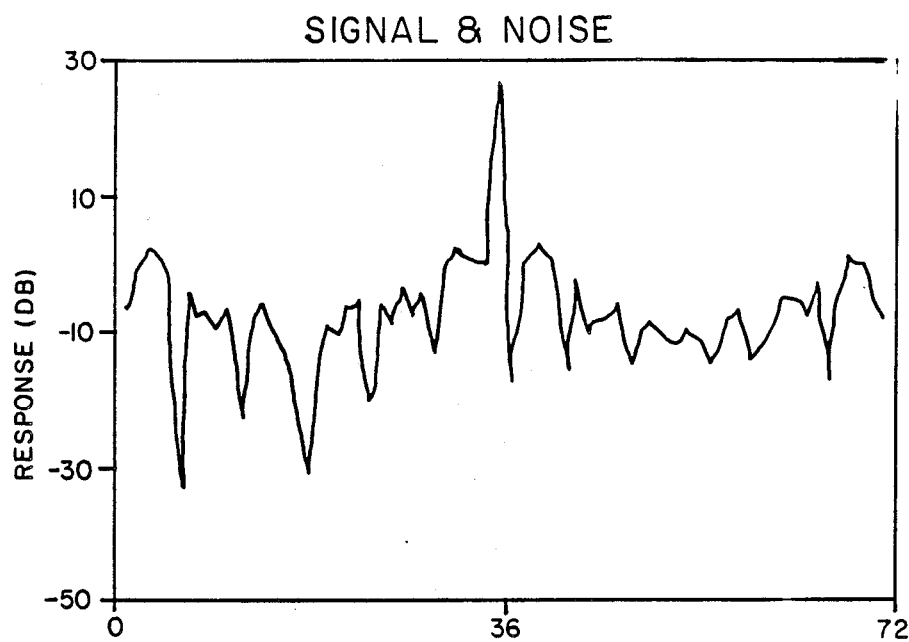

FIG. 4 shows the output of the pulse compressor using the invention. The outputs are based upon the implementation of a 36 element pulse compression code, a threshold angle $\Theta_T$ of 18 degrees, a weight computation using N=4 in equation (1), and a zero doppler point target return having a signal to noise ratio of 20 decibels per code element. The theoretical uncanceled signal level after pulse compression is arbitrarily scaled to be +20db. However, the signal is cancelled in the adaptive MTI circuit to −14db at the time (sample number 36) it would be +20db if it were not cancelled. In FIG. 5, the same parameters as above apply except the target doppler is at 90° or ($f_d = \frac{1}{4}T$). Thus, because of the sign reversal used in the modified weighting given by equation (3), the moving target in FIG. 5(a), is enhanced by 6db, and in FIG. 5(c) the target is easily detected.

In an alternate embodiment the weight W(i) could be determined in a batch-type procedure, instead of the sliding window procedure indicated by equation (1), where a weight is determined from an average over N samples as given by equation (1) except that the same weight is applied to each of the N auxiliary signals in the batch of N samples, rather than being updated on each new range cell.

In a second alternative embodiment wherein the radar is mounted on a moving platform, the speed of the platform will shift the phase reference angle from 0 to $\Theta_r$, which will require a corresponding comparison of $|\Theta - \Theta_r|$ to the preselected threshold value of $\Theta_T$. In FIG. 3, circuit 50, which determines the absolute value of the weight angle would be modified in a known manner to subtract the reference angle $\Theta_r$ from the angle $\Theta$.

The foregoing has described an adaptive MTI radar system with pulse compression for preventing target signal cancellation in the clear or in a clutter background. This is accomplished by shifting the phase of a weighting signal generated by a digital open-loop canceller, in an adaptive MTI radar system. For weighting signal angles less than or equal to a preselected threshold angle, the weighting signal is left unchanged, thereby permitting relatively weak moving target signals embedded in strong clutter to be detected. However, for weighting signals greater than the preselected threshold angle, the signal phase is shifted by 180 degrees, thereby preventing signal cancellation and providing enhancement for moving target signals in the clear.

Obviously, numerous modifications and variations of the present invention are possible in light of the above teachings. It is therefore to be understood that within the scope of the appended claims, the invention may be practiced otherwise than as specifically described herein.

WHAT IS CLAIMED AND DESIRED TO BE SECURED BY LETTERS PATENT OF THE UNITED STATES IS:

1. A method for preserving targets in the clear in an adaptive baseband MTI radar system with pulse compression, comprising the steps of:

receiving a target return signal;

generating a digitized and time sampled signal $x_1(i)$ having in-phase I and quadrature Q components of said target return signal, wherein $x_1(i)$ is the ith sampled complex signal for a range cell;

generating a second signal $x_2(i)$, wherein $x_2(i)$ is delayed by one pulse repetition interval from said signal $x_1(i)$;

generating a first complex weighting signal $W(i)$ from said first and second signals $x_1(i)$ and $x_2(i)$;

determining an angle $\Theta$ of said weighting signal, wherein said angle $\Theta$ is represented in terms of the in-phase I and quadrature Q components of said weighting signal such that $\Theta = \tan^{-1} Q/I$;

comparing the absolute value of said angle $\Theta$ to a threshold angle $\Theta_T$;

generating a modified complex weighting signal $W'$ from said first complex weighting signal according to the following expression:

$W' = W$ for $|\Theta| \leq \Theta_T$ $W' = -W$ for $|\Theta| > \Theta_T$;

combining signal pulses $x_1(i)$ and $x_2(i)$ spaced a period T apart with said modified complex weighting signal $W'$ and producing a residual signal $e_o(i)$ according to the following expression:

$e_o(i) = x_1(i) - W'(i) \cdot x_2(i)$; and compressing said residual signal.

2. A method as described in claim 1 wherein said complex weighting signal is determined by the equation $$W(i) = \frac{\sum_{k=i-N+1}^{i} x_1(k) \cdot x_2^*(k)}{\sum_{k=i-N+1}^{i} |x_2(k)|^2}$$

where N is the number of sampled range cells that are processed in a sliding window to determine the weight w.

3. A method as described in claim 1 wherein said comparing step includes subtracting $\Theta_r$ from $\Theta$, such that the absolute value of $(\Theta - \Theta_r)$ is compared to said preselected threshold angle $\Theta_T$, wherein $\Theta_r$ represents the reference angle phase shift for a radar mounted on a moving platform.

4. A system for preserving targets in the clear in an adaptive MTI with pulse compression comprising:

means for receiving a target return signal;

means for generating a digitized and time sampled signal $x_1(i)$ having in-phase I and quadrature Q components of said target return signal, wherein $x_1(i)$ is the ith sampled complex signal for a range cell;

means for generating a second signal $x_2(i)$, wherein $x_2(i)$ is delayed by one pulse repetition interval from signal $x_1(i)$;

means for receiving said signals $x_1(i)$ and $x_2(i)$ and generating a first complex weighting signal $W(i)$;

means for determining an angle $\Theta$ of said weighting signal, wherein said angle $\Theta$ is represented in terms of the in-phase I and quadrature Q components of said weighting signal such that $\Theta = \tan^{-1} Q/I$;

means for comparing the absolute value of said angle $\Theta$ to a preselected threshold angle $\Theta_T$;

means for generating a modified complex weighting signal $W'$ from said first complex weighting signal according to the following expression $W' = W$ for $|\Theta| \leq \Theta_T$ $W' = -W$ for $|\Theta| > \Theta_T$;

means for combining signal pulses $x_1(i)$ and $x_2(i)$ spaced a period T apart with said modified complex weighting signal $W'$ and producing a residual signal $e_o(i)$ according to the following expression:

$e_o(i) = x_1(i) - W'(i)x_2(i)$; and means for compressing said residual signal.

5. A system as described in claim 4 wherein said means for generating a first complex weighting signal W, generates said weighting signal according to the following expression:

$$W(i) = \frac{\sum_{k=i-N+1}^{i} x_1(k) \cdot x_2^*(k)}{\sum_{k=i-N+1}^{i} |x_2(k)|^2}$$

6. A system as described in claim 4 wherein said means for comparing includes subtracting $\Theta_r$ from $\Theta$, such that the absolute value of $(\Theta - \Theta_r)$ is compared to said threshold angle $\Theta_T$, wherein $\Theta_r$ represents the reference angle phase shift for a radar mounted on a moving platform.

* * * * *